(12) United States Patent
Wu

(10) Patent No.: US 6,236,684 B1
(45) Date of Patent: May 22, 2001

(54) WAVELET TRANSFORM METHOD AND APPARATUS

(75) Inventor: Zhixiong Wu, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 08/883,956

(22) Filed: Jun. 27, 1997

(30) Foreign Application Priority Data

Jun. 28, 1996 (JP) .................................................. 8-169906
Sep. 19, 1996 (JP) .................................................. 8-247969

(51) Int. Cl.$^7$ ...................................................... H04N 7/18
(52) U.S. Cl. ................................. 375/240.19; 375/240.18
(58) Field of Search ..................................... 348/397, 398; 382/232, 239, 240, 282; 375/240.19, 240.18

(56) References Cited

U.S. PATENT DOCUMENTS

| | | | |
|---|---|---|---|
| 5,347,479 | * 9/1994 | Miyazaki .............................. | 364/725 |
| 5,563,960 | * 10/1996 | Shapiro ................................ | 382/239 |
| 5,602,589 | * 2/1997 | Vishwanath et al. ................ | 348/398 |
| 5,657,085 | * 8/1997 | Katto ................................... | 348/398 |
| 5,710,835 | * 1/1998 | Bradley ................................ | 382/233 |
| 5,757,974 | * 5/1998 | Impagliazzo et al. ............... | 382/248 |
| 5,764,807 | * 6/1998 | Pearlman et al. .................... | 382/240 |
| 5,777,678 | * 7/1998 | Ogata et al. ......................... | 348/398 |
| 5,819,215 | * 10/1998 | Dobson et al. ....................... | 704/230 |
| 5,825,935 | * 10/1998 | Murakoshi ........................... | 382/248 |
| 5,828,849 | * 10/1998 | Lempel et al. ....................... | 382/232 |
| 5,838,377 | * 11/1998 | Greene ................................. | 348/398 |
| 5,852,681 | * 12/1998 | Amaratunga et al. ............... | 382/268 |
| 5,867,221 | * 2/1999 | Pullen et al. ......................... | 348/417 |
| 5,867,602 | * 2/1999 | Zandi et al. .......................... | 382/248 |
| 5,946,417 | * 8/1999 | Bonneau et al. ..................... | 382/236 |

OTHER PUBLICATIONS

Mallet, "A Theory for Multiresolution Signal Decomposition: The Wavelet Representation", IEEE Transactions on Pattern Analysis and Machine Intelligence, vol. 11, No. 7, Jul. 1989, pp. 674–693.

Egger O et al.: "Arbitrarily–Shaped Wavelet Packets for Zerotree Coding" 1996 IEEE International Conference on Acoustics, Speech, and Signal Processing—Proceedings. (ICASSP), Atlanta, May 7–10. 1996, vol. 4, No. Conf. 21, May 7, 1996, pp. 2335–2338, XP000681695 Institute of Electrical and Electronics Engineers.

Parhi K K et al.: "VLSI Architectures for Discrete Wavelet Transforms" IEEE Transactions on Very Large Scale Integration (VLSI) Systems, vol. 1, No. 2, Jun. 1, 1993, pp. 191–202, XP000390612.

* cited by examiner

*Primary Examiner*—Andy Rao
(74) *Attorney, Agent, or Firm*—Wenderoth, Lind & Ponack, L.L.P.

(57) ABSTRACT

An N-level wavelet transform is executed on an image signal representing an image having a first dimension and a second dimension. First, an N-level one-dimensional wavelet transform is executed in the first dimension, thereby generating an intermediate signal which is temporarily stored in a memory device; then an N-level one-dimensional wavelet transform is executed on the intermediate signal in the second dimension. The image signal may be accompanied by shape information describing the shape of the image, in which case each N-level one-dimensional wavelet transform is executed by a series of N one-level wavelet transforms, with alteration of the shape information when each one-level wavelet transform is performed.

5 Claims, 9 Drawing Sheets

FIG. 2

| $S_{LL1}$ | $S_{HL1}$ | $S_{HL20}$ | $S_{HL30}$ |
|---|---|---|---|
| $S_{LH1}$ | $S_{HH1}$ | $S_{HL21}$ | $S_{HL31}$ |
| $S_{LH02}$ | $S_{LH12}$ | $S_{HH2}$ | $S_{HL32}$ |
| $S_{LH03}$ | $S_{LH13}$ | $S_{LH23}$ | $S_{HH3}$ |
| $S_{L1}$ | $S_{H1}$ | $S_{H2}$ | $S_{H3}$ |

FIG. 3

$$\begin{pmatrix} x_0 \\ x_1 \\ x_2 \\ x_3 \\ x_4 \\ x_5 \\ x_6 \\ x_7 \end{pmatrix}$$

$$M_{38} = \begin{pmatrix} 0 & 0 & 0 & h_2 & 0 & 0 & 0 & g_2 \\ 0 & 0 & 0 & h_1 & 0 & 0 & 0 & g_1 \\ 0 & 0 & h_2 & 0 & 0 & 0 & g_2 & 0 \\ 0 & 0 & h_1 & 0 & 0 & 0 & g_1 & 0 \\ 0 & h_2 & 0 & 0 & 0 & g_2 & 0 & 0 \\ 0 & h_1 & 0 & 0 & 0 & g_1 & 0 & 0 \\ h_2 & 0 & 0 & 0 & g_2 & 0 & 0 & 0 \\ h_1 & 0 & 0 & 0 & g_1 & 0 & 0 & 0 \end{pmatrix}$$

·

$$M_{40} = \begin{pmatrix} 0 & 0 & 0 & 0 & 0 & 0 & 0 & 1 \\ 0 & 0 & 0 & 0 & 0 & 0 & 1 & 0 \\ 0 & 0 & 0 & 0 & 0 & 1 & 0 & 0 \\ 0 & 0 & 0 & 0 & 1 & 0 & 0 & 0 \\ 0 & h_2 & 0 & g_2 & 0 & 0 & 0 & 0 \\ 0 & h_1 & 0 & g_1 & 0 & 0 & 0 & 0 \\ h_2 & 0 & g_2 & 0 & 0 & 0 & 0 & 0 \\ h_1 & 0 & g_1 & 0 & 0 & 0 & 0 & 0 \end{pmatrix}$$

·

$$M_{42} = \begin{pmatrix} 0 & 0 & 0 & 0 & 0 & 0 & 0 & 1 \\ 0 & 0 & 0 & 0 & 0 & 0 & 1 & 0 \\ 0 & 0 & 0 & 0 & 0 & 1 & 0 & 0 \\ 0 & 0 & 0 & 0 & 1 & 0 & 0 & 0 \\ 0 & 0 & 0 & 1 & 0 & 0 & 0 & 0 \\ 0 & 0 & 1 & 0 & 0 & 0 & 0 & 0 \\ h_2 & g_2 & 0 & 0 & 0 & 0 & 0 & 0 \\ h_1 & g_1 & 0 & 0 & 0 & 0 & 0 & 0 \end{pmatrix}$$

$$= \begin{pmatrix} y_0 \\ y_1 \\ y_2 \\ y_3 \\ y_4 \\ y_5 \\ y_6 \\ y_7 \end{pmatrix}$$

$$\begin{pmatrix} y_0 \\ y_1 \\ y_2 \\ y_3 \\ y_4 \\ y_5 \\ y_6 \\ y_7 \end{pmatrix} = \begin{pmatrix} a_{1.1} & a_{2.1} & a_{3.1} & a_{4.1} & a_{5.1} & a_{6.1} & a_{7.1} & a_{8.1} \\ a_{1.2} & a_{2.2} & a_{3.2} & a_{4.2} & a_{5.2} & a_{6.2} & a_{7.2} & a_{8.2} \\ a_{1.3} & a_{2.3} & a_{3.3} & a_{4.3} & a_{5.3} & a_{6.3} & a_{7.3} & a_{8.3} \\ a_{1.4} & a_{2.4} & a_{3.4} & a_{4.4} & a_{5.4} & a_{6.4} & a_{7.4} & a_{8.4} \\ a_{1.5} & a_{2.5} & a_{3.5} & a_{4.5} & a_{5.5} & a_{6.5} & a_{7.5} & a_{8.5} \\ a_{1.6} & a_{2.6} & a_{3.6} & a_{4.6} & a_{5.6} & a_{6.6} & a_{7.6} & a_{8.6} \\ a_{1.7} & a_{2.7} & a_{3.7} & a_{4.7} & a_{5.7} & a_{6.7} & a_{7.7} & a_{8.7} \\ a_{1.8} & a_{2.8} & a_{3.8} & a_{4.8} & a_{5.8} & a_{6.8} & a_{7.8} & a_{8.8} \end{pmatrix}_{M_{46}} \begin{pmatrix} x_0 \\ x_1 \\ x_2 \\ x_3 \\ x_4 \\ x_5 \\ x_6 \\ x_7 \end{pmatrix}$$

WAVELET TRANSFORM METHOD AND APPARATUS

BACKGROUND OF THE INVENTION

The present invention relates to a method and apparatus for executing a wavelet transform on an image signal.

The wavelet transform is a mathematical tool for characterizing the local properties of a signal at a variety of resolutions. In recent years, this has been found to be an effective way to compress digitized image signals.

When the wavelet transform is applied to an image signal by the pyramid method of the prior art, which will be described in more detail later, the image signal passes in succession through a plurality of stages. In each stage, the signal is filtered horizontally and vertically, and the resolution of the signal is reduced by half in each dimension.

One problem with this method is the repeated need for temporary storage of the image signal. Signal storage is necessary between the horizontal filtering and vertical filtering operations in each stage of the transform, and is also necessary between the different stages. A filtering operation cannot begin until the signal has been stored, so besides consuming memory space, the repeated storage operations impair the speed of the transform.

Another problem is that in the final output signal of the transform, high and low spatial frequencies are mixed in a way that is not advantageous for compression. This problem will be described in more detail later.

A further problem is that the prior-art method works only with rectangular images. If an image is not rectangular, it must be embedded in a rectangle, and the non-image parts of the rectangle must be filled in with, for example, the average value of the image signal, or with signal values copied from the border of the image. Efficient compression of the resulting rectangular image tends to be impaired by high-frequency artifacts generated by the abrupt transitions between the image area and the filled-in area.

SUMMARY OF THE INVENTION

It is accordingly an object of the present invention to execute a wavelet transform on a two-dimensional image signal without requiring a repeated storing of the image signal.

Another object of the present invention is to produce a wavelet transform output signal that can be highly compressed by further encoding.

Yet another object is to execute a wavelet transform on a two-dimensional image signal representing an image with an arbitrary shape, without generating artifacts.

According to a first aspect of the invention, an N-level wavelet transform is executed on an image signal, where N is an integer greater than one. The image signal represents an image having a first dimension and a second dimension. First, an N-level one-dimensional wavelet transform is executed on the image signal in the first dimension, generating an intermediate signal which is temporarily stored in a memory device. Then an N-level one-dimensional thereby wavelet transform is executed on the intermediate signal in the second dimension. Each N-level one-dimensional wavelet transform is preferably executed by a single matrix operation.

According to a second aspect of the invention, an N-level wavelet transform is executed on an image signal, where N is an integer greater than zero. The image signal represents an image having a first dimension and a second dimension, and having an arbitrary shape. The image signal is accompanied by shape information describing the shape of the image. First, N single-level one-dimensional wavelet transforms are executed on the image signal in a cascaded series in the first dimension, thereby generating an intermediate signal which is temporarily stored in a memory device. When each single-level one-dimensional wavelet transform is executed, the shape information is altered to describe the shapes of the component signals resulting from the transform. Next, N single-level one-dimensional wavelet transforms are executed on the intermediate signal in a cascaded series in the second dimension, accompanied by further similar alterations of the shape information.

BRIEF DESCRIPTION OF THE DRAWINGS

FIG. 2 illustrates the decomposition of an image signal into high-frequency and low-frequency components by the first embodiment;

FIG. 3 mathematically illustrates the operation of the N-level vertical wavelet filter in the first embodiment;

DETAILED DESCRIPTION OF THE INVENTION

Embodiments of the invention will be described with reference to the attached drawings, but first, it will be useful to give some general information and describe the prior art in more detail.

Figure 8:
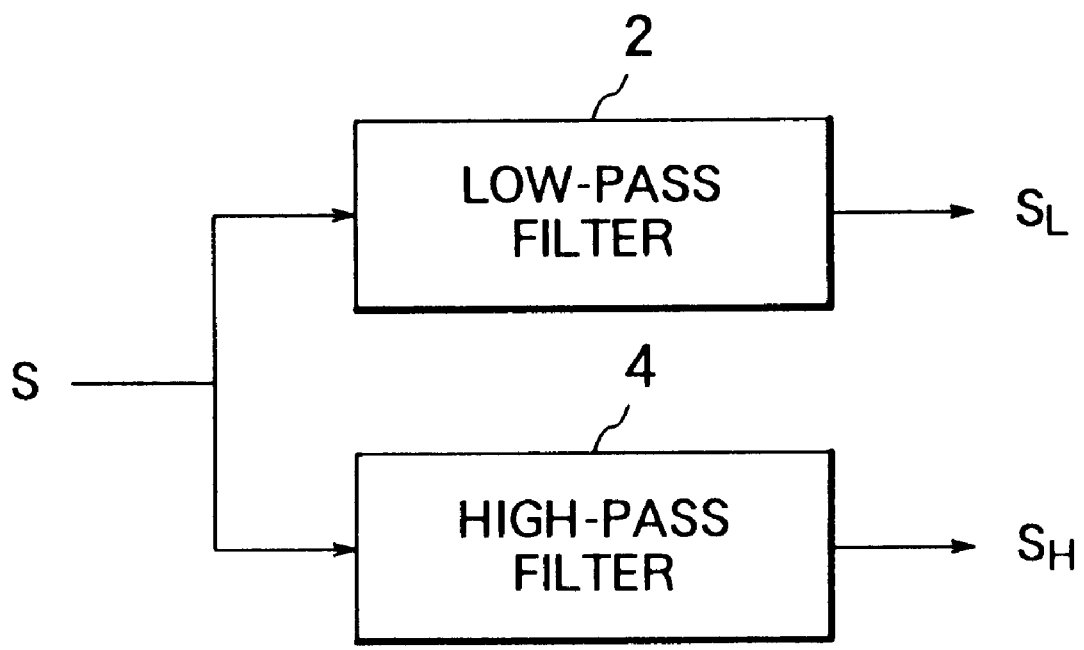
FIG. 8 is a block diagram illustrating a single-level one-dimensional wavelet filter.

Referring to FIG. 8, a single-level one-dimensional wavelet filter comprises a low-pass filter 2 and a high-pass filter 4, both of which receive the same input signal S. If $S_L$ is the output of the low-pass filter 2 and $S_H$ is the output of the high-pass filter 4, the operation of the wavelet filter can be described by the equations shown below, in which m is a positive integer, n is a non-negative integer, h(k) are the filter coefficients of the low-pass filter 2, and g(k) are the filter coefficients of the high-pass filter 4 (k=−n, ..., m).

$$S_L(i) = \sum_{k=-n}^{k=m} S(2i+k)h(k)$$

$$S_H(i) = \sum_{k=-n}^{k=m} S(2i+k)g(k)$$

The two output signals $S_L$ and $S_H$ each have half the resolution of the input signal S. Resolution can be expressed as the number of signal samples. For integers N greater than unity, an N-level one-dimensional wavelet transform is carried out by iterating this process on the low-frequency component $S_L$.

Figure 9:
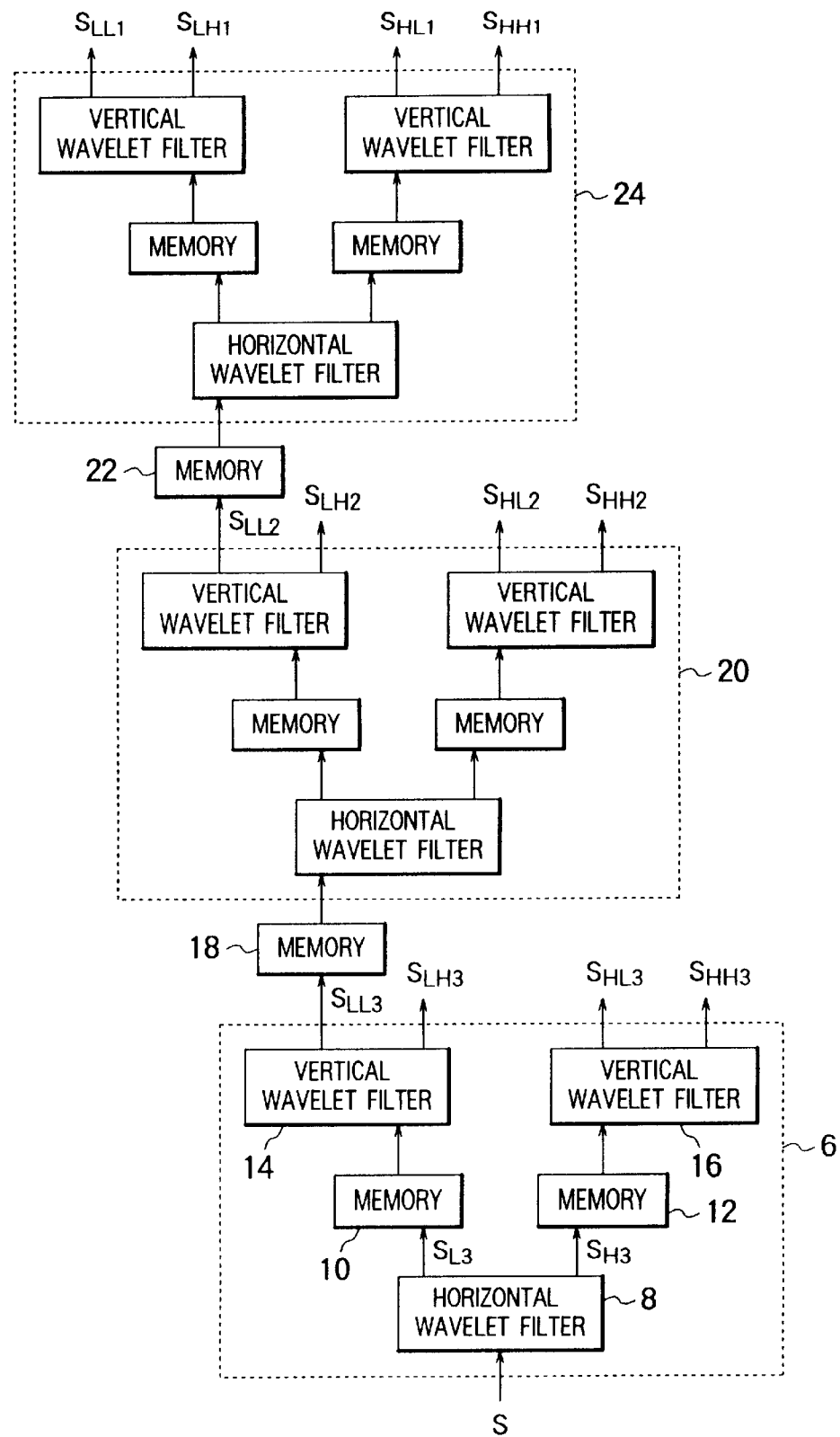
FIG. 9 is a block diagram illustrating the prior art.

When the input signal represents a two-dimensional image, wavelet filtering is performed separately in each dimension. FIG. 9 shows an apparatus for performing a three-level wavelet transform on a two-dimensional image signal by the pyramid method of the prior art.

In the first stage 6 of the apparatus, a horizontal wavelet filter 8 executes a single-level one-dimensional wavelet transform on each horizontal row of picture elements, thereby obtaining a low-frequency component signal $S_{L3}$ which is temporarily stored in a memory device 10, and a high-frequency component signal $S_{H3}$ which is temporarily stored in a memory device 12. Then a first vertical wavelet filter 14 performs a single-level one-dimensional wavelet transform on each vertical column of picture elements in $S_{L3}$, thereby obtaining a low-frequency component signal $S_{LL3}$ and a high-frequency component signal $S_{LH3}$, and a second vertical wavelet filter 14 performs a single-level one-dimensional wavelet transform on each vertical column of picture elements in $S_{H3}$, thereby obtaining a low-frequency component signal $S_{HL3}$ and a high-frequency component signal $S_{HH3}$. Of these four signals, the purely low-frequency component signal $S_{LL3}$ is temporarily stored in a memory device 18, while $S_{LH3}$, $S_{HL3}$, and $S_{HH3}$, which contain high-frequency components, are output without further processing.

The internal memory devices 10 and 12 are necessary because the horizontal wavelet filter 8 generates the picture elements of the $S_{L3}$ and $S_{H3}$ signals in one order, working horizontally one row at a time, but the vertical wavelet filters 14 and 16 process the same $S_{L3}$ and $S_{H3}$ signals in a different order, working vertically one column at a time.

The second stage 20 has the same internal configuration as the first stage 6, and operates in similar fashion on the signal $S_{LL3}$ stored in memory device 18 to obtain four more signals, denoted $S_{LL2}$, $S_{LH2}$, $S_{HL2}$, and $S_{HH2}$. Of these signals, $S_{LL2}$ is stored in a memory device 22, and $S_{LH2}$, $S_{HL2}$, and $S_{HH2}$ are output without further processing.

The third stage 24 has the same internal configuration, and operates in a similar fashion on the signal $S_{LL2}$ stored in memory device 22, obtaining four more output signals $S_{LL1}$, $S_{LH1}$, $S_{HL1}$, and $S_{HH1}$. It can be seen that five temporary storage operations are needed to obtain each of these signals, including one storage operation in each of the three stages 6, 22, and 24, and two more storage operations between the stages, in memory devices 18 and 22.

Figure 10:
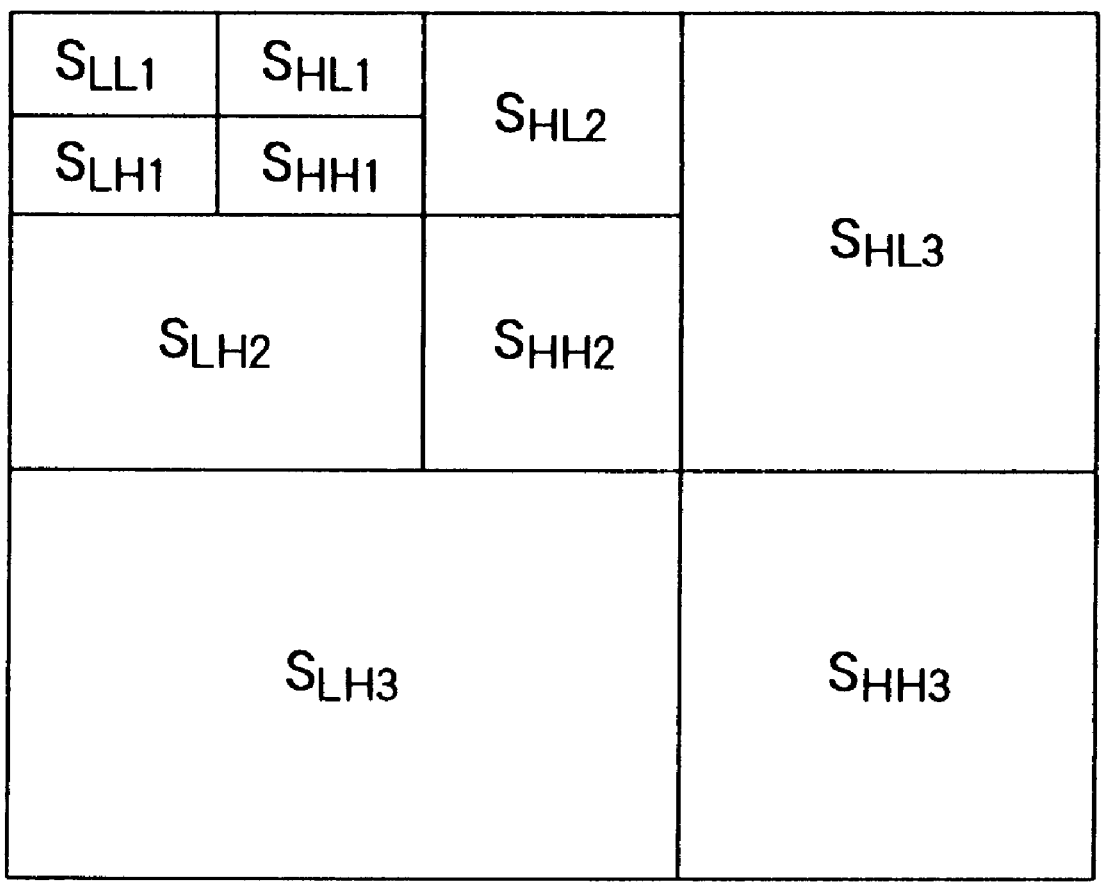
FIG. 10 illustrates the decomposition of an image signal into high-frequency and low-frequency components in the prior art.

FIG. 10 locates the ten resulting output signals in the two-dimensional plane. The plane is iteratively decomposed by dividing lines, each separating a low spatial frequency component (above or to the left of the dividing line) from a high spatial frequency component (below or to the right of the dividing line). The signal $S_{HL3}$, for example, represents a high horizontal spatial frequency component and a low vertical spatial frequency component.

The presence of this low vertical spatial frequency component means that the $S_{HL3}$ signal possesses a strong residual correlation in the vertical dimension, which limits the amount by which this signal can be compressed by further encoding. Compression of $S_{LH3}$, $S_{HL2}$, and $S_{LH2}$ is similarly limited by residual correlation.

First Embodiment

Figure 1:
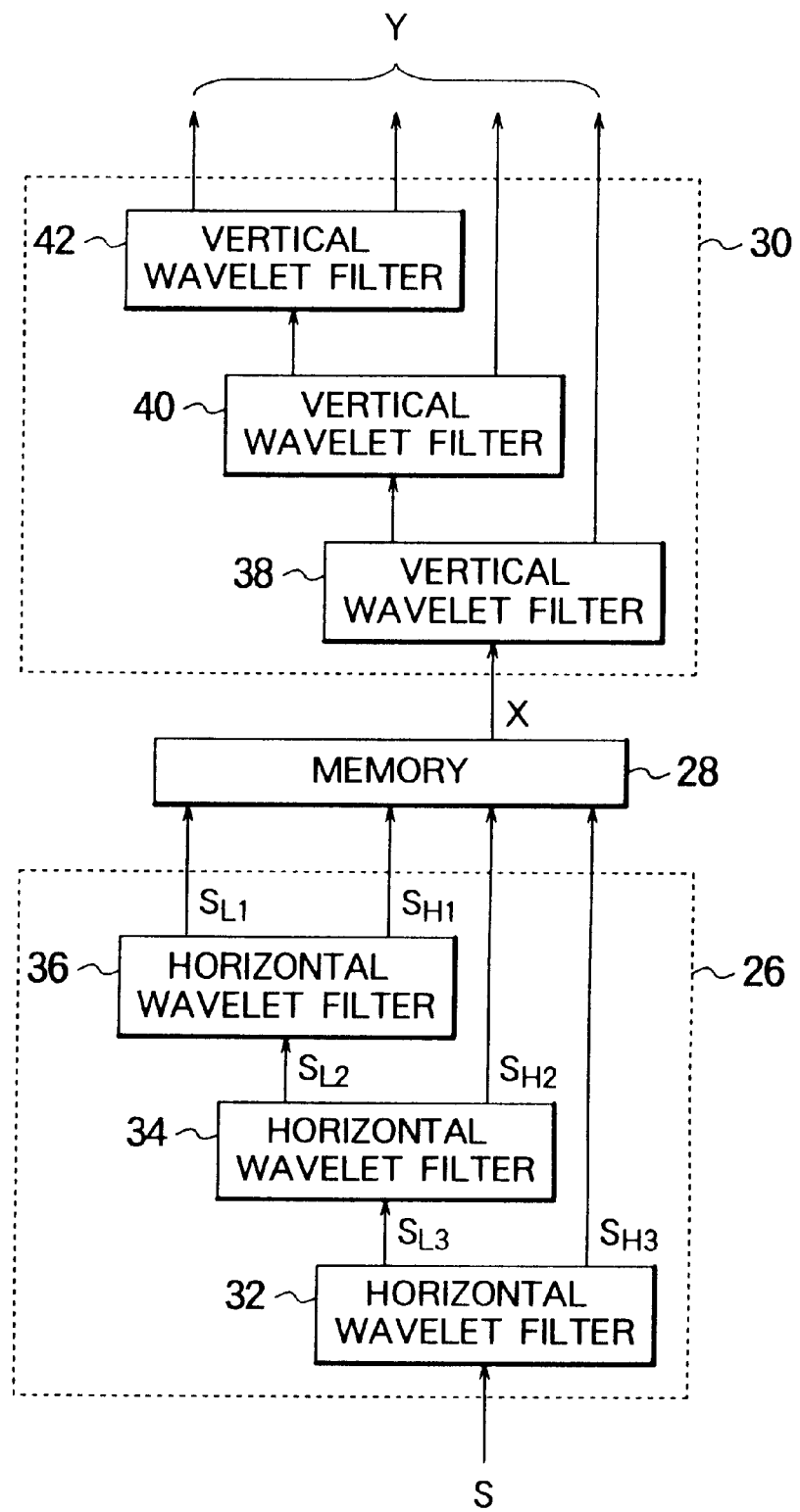
FIG. 1 is a block diagram illustrating a first embodiment of the invention.

Referring to FIG. 1, a first novel wavelet transform apparatus comprises an N-level horizontal wavelet filter 26, a memory device 28, and an N-level vertical wavelet filter 30. In this embodiment N is equal to three. Filter 26 comprises three cascaded single-level horizontal wavelet filters 32, 34, and 36, while filter 30 comprises three cascaded single-level vertical wavelet filters 38, 40, and 42. The memory device 28 stores the output of the N-level horizontal wavelet filter 26 as an intermediate signal X, which is provided as input to the N-level vertical wavelet filter 30.

The wavelet transform performed by the first embodiment will be referred to as a separable wavelet transform, because it can be separated into a horizontal one-dimensional wavelet transform followed by a vertical one-dimensional wavelet transform.

The individual wavelet filters 32, 24, 36, 38, 40, and 42 comprise well-known electronic computing circuits, descriptions of which will be omitted to avoid obscuring the invention with unnecessary detail.

In the N-level horizontal wavelet filter 26, horizontal wavelet filter 32 decomposes the input two-dimensional image signal S into a low-frequency component $S_{L3}$ and a high-frequency component $S_{H3}$ by applying the equations given above to each horizontal row of picture elements in S. In the same way, horizontal wavelet filter 34 decomposes $S_{L3}$ into a low-frequency component $S_{L2}$ and a high-frequency component $S_{H2}$, and horizontal wavelet filter 36 decomposes $S_{L2}$ into a low-frequency component $S_{L1}$ and a high-frequency component $S_{H1}$.

The three single-level horizontal wavelet filters 32, 34, and 36 are thus cascaded by transmitting the low-frequency component from one filter to the next. In this process, it is not necessary to store the entire $S_{L3}$ component signal between filters 32 and 34, because filter 34 processes the $S_{L3}$ signal values in the same order as the order of output from horizontal wavelet filter 32, working horizontally one row at a time. Similarly, it is not necessary to store the entire $S_{L2}$ signal between filters 34 and 36.

The memory device 28 stores the four signals $S_{L1}$, $S_{H1}$, $S_{H2}$, and $S_{H3}$. Vertical wavelet filter 38 decomposes each of these four signals into a low-frequency component and a high-frequency component. Vertical wavelet filter 40 then decomposes each of the four low-frequency components output by vertical wavelet filter 38 into a further low-frequency component and a high-frequency component, and vertical wavelet filter 42 decomposes each of the four low-frequency components output by vertical wavelet filter 38 into a still further low-frequency component and a high-frequency component. The output Y of the first embodiment comprises the high-frequency components output by vertical wavelet filters 38, 40, and 42, and the low-frequency component output by vertical wavelet filter 42.

FIG. 2 exhibits the output of the first embodiment in the two-dimensional plane, the dividing lines representing the separation of low-frequency from high-frequency components as in FIG. 10. First the N-level horizontal wavelet filter 26 divides the plane into four areas delimited by vertical lines in FIG. 2, representing the four signals $S_{L1}$, $S_{H1}$, $S_{H2}$, and $S_{H3}$. Then the N-level vertical wavelet filter 30 divides each of these four areas into four sub-areas, representing sixteen separate component signals in all.

Of these sixteen signals, $S_{LL1}$, $S_{LH1}$, $S_{HL1}$, $S_{HH1}$, $S_{HH2}$, and $S_{HH3}$ are identical to the corresponding signals in FIG. 10. The area that produced one signal component $S_{HL3}$ in FIG. 10, however, is divided into three components $S_{HL30}$, $S_{HL31}$, and $S_{HL32}$ in FIG. 2. When $S_{HL32}$ is compressed by further encoding, a higher compression ratio can be achieved than the ratio achievable for $S_{HL3}$ in FIG. 10, because the lowest vertical spatial frequencies are eliminated and the residual correlation is less. Similar gains in compression are obtained in $S_{LH23}$ and in several other components in FIG. 2, so the overall compression ratio is significantly improved.

The operation of the N-level vertical wavelet filter 30 will next be described mathematically as a triple matrix operation, for the case of an image with a height of eight picture elements. The operation is partly shown in FIG. 3. The column vector at the right represents one column in the image after filtering by the N-level horizontal wavelet filter 26. In the notation given above, $x_0$ to $x_7$ are elements of one of the four signals $S_{L1}$, $S_{H1}$, $S_{H2}$, and $S_{H3}$.

In this case, the high-pass and low-pass filters in each single-level wavelet filter have only two non-zero coefficients each. The coefficients of the low-pass filter are $h_1$ and $h_2$. The coefficients of the high-pass filter are $g_1$, and $g_2$. The vertical wavelet filter 38 is mathematically represented by the matrix $M_{38}$. The vertical wavelet filters 40 and 42 are similarly represented by matrices $M_{40}$ and $M_{42}$.

The column vector at the right is multiplied in turn by matrices $M_{38}$, $M_{40}$, and $M_{42}$, producing the output column vector at the left. In the notation of FIG. 2, if $x_0$ to $x_7$ are elements of $S_{L1}$, for example, then $y_0$ is an element of $S_{LL1}$, $y_1$ is an element of $S_{LH1}$, $y_2$ and $y_3$ are elements of $S_{LH02}$, and $y_4$, $y_5$, $Y_6$, and $Y_7$ are elements of $S_{LH03}$.

The operation of the N-level horizontal wavelet filter 26 can be similarly described as a triple matrix operation in which a row vector is successively multiplied by three matrices $M_{32}$, $M_{34}$, and $M_{36}$. If the input signal S is represented as a rectangular row-column matrix of picture elements, the entire operation of the first embodiment can be described in matrix form as follows:

$$X = S M_{32} M_{34} M_{36}$$

$$Y = M_{42} M_{40} M_{38} X$$

As noted above, the output signal Y is more compressible, by well-known techniques such as quantization, run-length encoding, and entropy encoding, than the output obtained in the prior art. In addition, during the transform process, the image signal has to be temporarily stored only once, instead of five times as in the prior art, so less memory space is required, and less time is taken up by memory access operations.

Second Embodiment

The second embodiment performs a separable wavelet transform by replacing the triple matrix operations described above with single matrix operations.

Figures 4, 5:
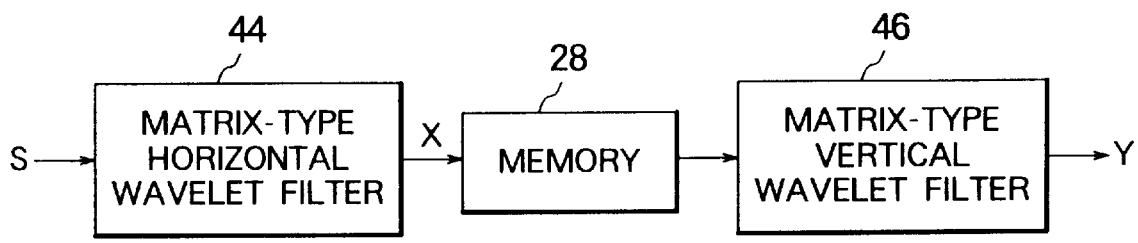
FIG. 4 is a block diagram illustrating a second embodiment.
FIG. 5 mathematically illustrates the operation of the N-level vertical wavelet filter in the second embodiment.

Referring to FIG. 4, the second embodiment comprises a matrix-type horizontal wavelet filter 44 that performs a single matrix operation on the input signal S, producing the intermediate signal X that is stored in the memory device 28. A matrix-type vertical wavelet filter 46 then completes the wavelet transform by performing a single matrix operation on the intermediate signal X.

The filters 44 and 46 are matrix processors. If the single matrix operation performed by the horizontal wavelet filter 44 is represented by a matrix $M_{44}$, and the single matrix performed by the vertical wavelet filter 46 by a single matrix $M_{46}$, then the operation of the second embodiment can be described mathematically as follows:

$$X = S M_{44}$$

$$Y = M_{46} X$$

The matrices $M_{44}$ and $M_{46}$ are the products of the corresponding matrices in the first embodiment:

$$M_{44} = M_{32} M_{34} M_{36}$$

$$M_{46} = M_{42} M_{40} M_{38}$$

FIG. 5 partially depicts the operation of the vertical wavelet filter 46, showing a column vector being multiplied by matrix $M_{46}$. In effect, the second embodiment performs the matrix multiplication operation $M_{42} M_{40} M_{38}$ ahead of time, instead of performing this operation each time the wavelet transform is carried out. The second embodiment therefore operates faster than the first embodiment.

Third Embodiment

The third embodiment carries out a separable wavelet transform on images with arbitrary shapes.

Figure 6:
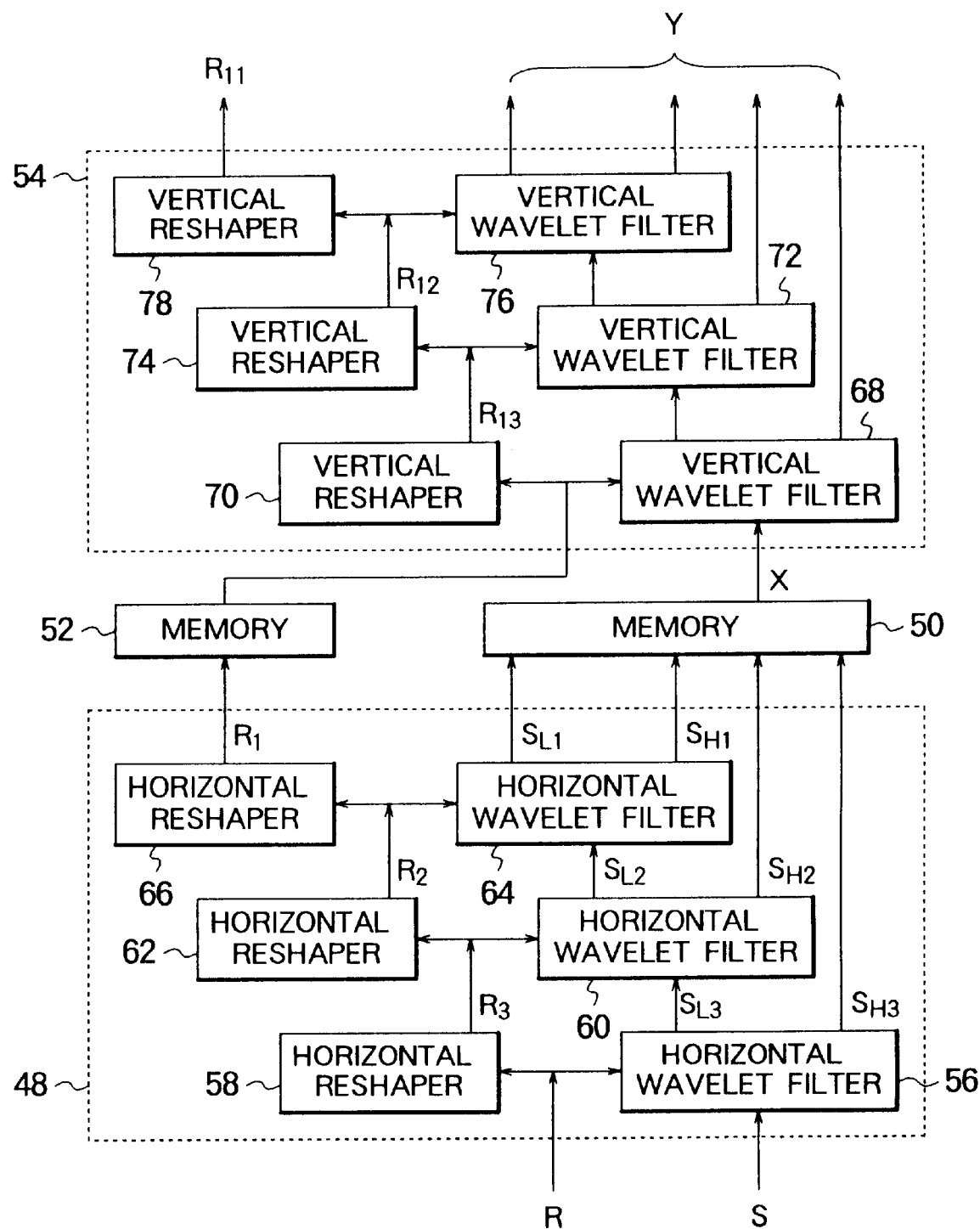
FIG. 6 is a block diagram illustrating a third embodiment.

Referring to FIG. 6, the third embodiment comprises an N-level horizontal wavelet filter 48, a pair of memory devices 50 and 52, and an N-level vertical wavelet filter 54. N is again equal to three.

The input to the third embodiment comprises two signals: an image signal S giving the values of picture elements in the image, and shape information R describing the shape of the image. The image is treated as being embedded in a rectangular area. The shape information R indicates which parts of the rectangular area belong to the image. The shape information R comprises, for example, a rectangular bit mask, or a run-length encoding of such a bit mask.

In the N-level horizontal wavelet filter 48, a first single-level horizontal wavelet filter 56 performs a wavelet filtering operation on the input signal S according to the shape information R. If, for example, the rectangular area has a width of m picture elements, but only the first n picture elements in a certain horizontal row belong to the image (where m and n are positive integers and m is greater than n), then if n is an even number, horizontal wavelet filter 56 operates on all of these n picture elements, producing component signals $S_{L3}$ and $S_{H3}$ with n/2 elements each. if n is an odd number, horizontal wavelet filter 56 operates on the first n−1 picture elements, and appends the n−th picture element to the resulting low-frequency component signal $S_{L3}$, so that $S_{L3}$ has (n−1)/2+1 elements, and component signal $S_{H3}$ has (n−1)/2 elements.

A first reshaper 58 then alters the shape information R to describe the shape of the component signals $S_{L3}$ and $S_{H3}$. These component signals can be treated as being embedded in the left and right halves of a rectangular area with the same width m.

The altered shape information $R_3$ is supplied to a second single-level horizontal wavelet filter 60, which filters $S_{L3}$ according to $R_3$, and to a second horizontal reshaper 62. Reshaper 62 further alters $R_3$ to obtain shape information $R_2$ describing the shape of the low-frequency and high-frequency component signals $S_{L2}$ and $S_{H2}$ output by filter 60. Shape signal $R_2$ also retains information describing the shape of the high-frequency component signal $S_{H3}$ output by the first single-level horizontal wavelet filter 56.

Continuing in the same way, a third single-level horizontal wavelet filter 64 filters $S_{L2}$ according to $R_2$, and a third horizontal reshaper 66 alters $R_2$ to obtain shape information $R_1$ describing the shapes of the component signals $S_{L1}$ and $S_{H1}$ output by filter 64, as well as the shapes of $S_{H2}$ and $S_{H3}$. Component signals $S_{L1}$, $S_{H1}$, $S_{H2}$, and $S_{H3}$ are stored in memory device 50 as the intermediate signal X, while shape information $R_1$ is stored in memory device 52.

The N-level vertical wavelet filter 64 comprises a first single-level vertical wavelet filter 68 and vertical reshaper 70, a second single-level vertical wavelet filter 72 and vertical reshaper 74, and a third single-level vertical wavelet filter 76 and vertical reshaper 78, which operate on the intermediate signal X and shape information $R_1$ in the same way that the N-level horizontal wavelet filter 48 operated on S and R, although in the vertical dimension. Shape signal $R_1$ is successively altered by reshapers 70, 74, and 78 to obtain shape informations $R_{13}$, $R_{12}$, and $R_{11}$. The final outputs of the third embodiment are a wavelet transform signal Y and shape information $R_{11}$ describing the shapes of the various components of Y.

By altering the shape information as described above, the third embodiment is able to confine operations to the image area at every stage and level of the wavelet transform. No artifacts are introduced by transitions between image and non-image areas, and the output signal Y is free of spurious high-frequency components that would impede compression of the transformed image signal.

A further advantage of the third embodiment is that there is no need to generate dummy signal values to fill in non-image parts of the rectangular area.

Fourth Embodiment

The fourth embodiment applies the reshaping technique or the third embodiment to the pyramid method of the prior art.

Figure 7:
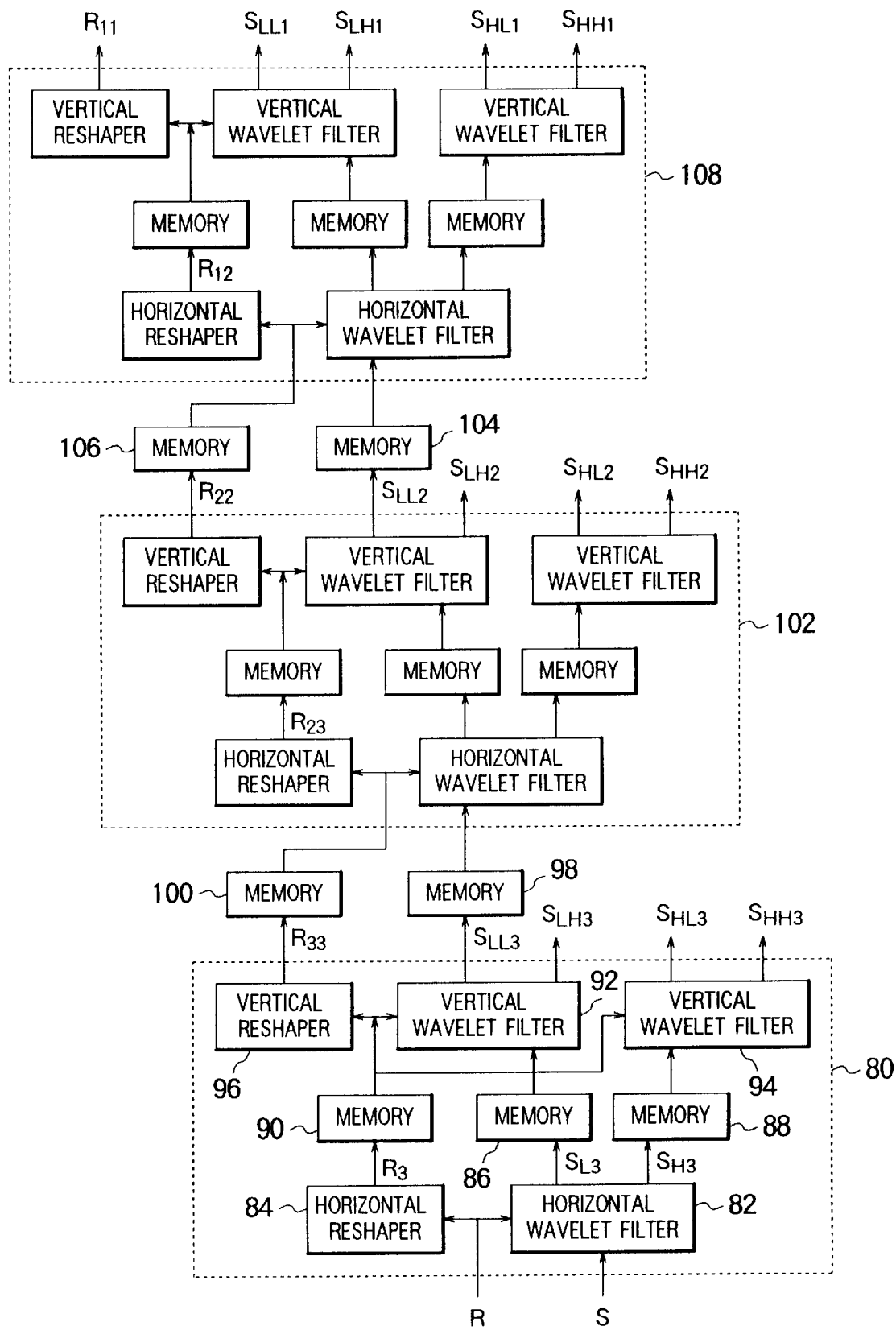
FIG. 7 is a block diagram illustrating a fourth embodiment.

FIG. 7 illustrates the fourth embodiment for a three-level wavelet transform. In the first stage 80, a single-level horizontal wavelet filter 82 filters the image signal S according to the shape information R, and a horizontal reshaper 84 alters R to obtain shape information $R_3$. The low-frequency and high-frequency components $S_{L3}$ and $S_{H3}$ generated by a filter 82 are stored in memory devices 86 and 88, and the altered shape information $R_3$ is stored in a memory device 90. The two single-level vertical wavelet filters 92 and 94 then filter $S_{L3}$ and $S_{H3}$ according to shape information $R_3$, obtaining component signals $S_{LL3}$, $S_{LH3}$, $S_{HL3}$, and $S_{HH3}$, and a vertical reshaper 96 alters $R_3$ to obtain shape information $R_{33}$ describing the shapes of these component signals.

Of the first-stage output signals, the low-frequency component signal $S_{LL3}$ and shape information $R_{33}$ are stored in a pair of memory devices 98 and are 100 and furnished to a second stage 102, which operates in the same manner as the first stage. The low-frequency component $S_{LL2}$ and shape information $R_{22}$ output from the second stage are stored in a pair of memory devices 104 and 106 and are furnished to a third stage 108, which also operates in the same manner. The final output of the wavelet transform comprises ten component signals $S_{LL1}$, $S_{LH1}$, $S_{HL1}$, $S_{HH1}$, $S_{LH2}$, $S_{HL2}$, $S_{HH2}$, $S_{LH3}$, $S_{HL3}$, and $S_{HH3}$, and shape information $R_{11}$ describing the shapes of these components.

The third and fourth embodiments both enable a wavelet transform of any number of levels to be performed on an image with an arbitrary shape, without generating high-frequency artifacts. The third embodiment is preferable to the fourth embodiment for the same reasons that the first embodiment is preferable to the prior art: less memory is required, operation is faster, and the output signal is more compressible because of being more finely divided in the two-dimensional plane.

Although horizontal filtering was performed before vertical filtering in the preceding embodiments, the order could be switched around. The second embodiment, for example, could be performed according to the following equations, without changing the final result Y.

$$X = M_{46} S$$

$$Y = X M_{44}$$

The individual single-level wavelet filters in the invention need not be separate electronic computing circuits. The invention can also be practiced by means of a suitably programmed general-purpose computing device such as a digital signal processor.

Those skilled in the art will recognize that other variations are possible within the scope claimed below.

What is claimed is:

1. A method of executing a wavelet transform on an image signal representing an image having a first dimension and a second dimension, responsive to shape information describing a shape of the image, comprising:

(e) executing a one-dimensional single-level wavelet transform on the image signal in the first dimension, responsive to the shape information, thereby generating a pair of component signals;

(f) temporarily storing the pair of component signals;

(g) converting the shape information to altered shape information describing shapes of the pair of component signals;

(h) temporarily storing the altered shape information; and (i) executing a one-dimensional single-level wavelet transform on the pair of component signals in the second dimension, responsive to the altered shape information, thereby generating a low-frequency component signal and three high-frequency component signals.

2. The method of claim 1, wherein said steps (e), (f), (g), (h), and (i) are iterated on the low-frequency component signal and the altered shape information, thereby executing an N-level wavelet transform, N being an integer greater than unity.

3. A wavelet transform apparatus for executing a single-level wavelet transform on an image signal representing an image having a first dimension and a second dimension, responsive to shape information describing a shape of the image, comprising:

a first wavelet filter operable to execute a one-dimensional single-level wavelet transform on the image signal in the first dimension, responsive to the shape information, thereby generating a low-frequency component signal and a high-frequency component signal;

a first memory device coupled to said first wavelet filter operable to store the low-frequency component signal;

a second memory device coupled to said first wavelet filter, operable to store the high frequency component signal;

a first reshaper operable to convert the shape information to altered shape information describing shapes of the high-frequency component signal;

a third memory device coupled to said reshaper, operable to store the altered shape information;

a second wavelet filter coupled to said first memory device, operable to execute a one-dimensional single-level wavelet transform on the low-frequency component signal in the second dimension, responsive to the altered shape information;

a third wavelet filter coupled to said second memory device, operable to execute a one-dimensional single-level wavelet transform on the high-frequency component signal in the second dimension, responsive to the altered shape information; and a second reshaper coupled to said third memory device, operable to further the altered shape information.

4. A method of executing an N-level wavelet transform on an image signal representing an image having a first dimension and a second dimension, N being an integer greater than one, said method comprising:

(a) executing an N-level one-dimensional wavelet transform on the image signal in the first dimension, thereby generating an intermediate signal;

(b) temporarily storing the intermediate signal; and (c) executing the N-level one-dimensional wavelet transform on the intermediate signal in the second dimension;

wherein said step (a) is performed by executing a single-level one-dimensional wavelet transform N times in succession, and said step (c) is performed by executing another single-level one-dimensional wavelet transform N times in succession; and wherein the image signal is accompanied by shape information describing a shape of the image, said method further comprising:

(d) altering the shape information after each said single-level one-dimensional wavelet transform in said step (a), and after each said single-level one-dimensional wavelet transform in said step (c), thereby making the shape information describe shapes of component signals generated by each said single-level one-dimensional wavelet transform in said steps (a) and (c).

5. A wavelet transform apparatus for executing an N-level wavelet transform on an image signal representing an image having a first dimension and a second dimension, N being an integer greater than one, said apparatus comprising:

a first N-level wavelet filter operable to execute an N-level one-dimensional wavelet transform on the image signal in the first dimension, thereby generating an intermediate signal;

a first memory device coupled to said first N-level wavelet filter, operable to store the intermediate signal; and a second N-level wavelet filter coupled to said first memory device, operable to execute an N-level one-dimensional wavelet transform on the intermediate signal in the second dimension;

wherein said first N-level wavelet filter comprises a first series of N single-level wavelet filters, each single-level wavelet filter in said first series operable to separately generate a high-frequency component signal and a low-frequency component signal, said N single-level wavelet filters in said first series being cascaded by transmission of the low-frequency component signals between adjacent single-level wavelet filters in said first series;

wherein said second N-level wavelet filter comprises a second series of N single-level wavelet filters, each single-level wavelet filter in said second series operable to separately generate a high-frequency component signal and a low-frequency component signal, said N single-level wavelet filters in said second series being cascaded by transmission of the low-frequency component signal between adjacent single-level wavelet filters in said second series;

wherein the image signal is accompanied by shape information describing a shape of the image;

wherein said first N-level wavelet filter also comprises a first series of N reshapers, corresponding to said first series of said N single-level wavelet filters, operable to alter the shape information in the first dimension to make the shape information describe shapes of the high-frequency component signal and the low-frequency component signal generated by corresponding single-level wavelet filters in said first series;

wherein said second N-level wavelet filter also comprises a second series of N reshapers, corresponding to said second series of said N single-level wavelet filters, operable to alter the shape information in the second dimension to make the shape information describe shapes of the high-frequency component signal and the low-frequency component signal generated by corresponding single-level wavelet filters in said second series; and wherein each of said single-level wavelet filters in said first series and said second series is operable according to the shape information.

* * * * *